3,260,687
FLAME-RESISTANT URETHANE FOAMS AND METHOD FOR PREPARING SAME

Steven M. Postol, Irvington, N.Y., assignor to Union Carbide Corporation, a corporation of New York
No Drawing. Filed Dec. 12, 1960, Ser. No. 75,095
8 Claims. (Cl. 260—2.5)

This invention relates to flame-resistant polyurethane foams, and particularly to such compositions which are self-extinguishing and possess a high degree of flame resistance.

Synthetic urethane foams derived from reactions involving isocyanates with active hydrogen-containing polyethers are finding widespread utility in the field of insulation, structural reinforcement, cushioning, electrical encapsulation and in domestic electrical equipment such as refrigerators, freezers and the like. One formidable factor limiting the commercial utilization and growth potential of the foamed urethane products is their risk of flammability in applications where high temperatures and/or exposure to fire may be encountered.

Various organic and inorganic compounds which have been recommended for the flameproofing of fibers, textiles, wood and plastics include, among others, boron, phosphorus and chlorine-containing compounds, the oxides of zinc, bismuth, antimony, arsenic and mixtures thereof. However, the incorporation of such compounds in low density urethane foams having large surface areas frequently results in a loss of desired physical properties which limit the utility of the foam for its intended purpose. For example, a halogen-containing material incorporated in a urethane foam may reduced flammability tendencies but at the same time act as a migrating plasticizer during the curing or foaming operation and effect a loss of tensile strength, compression set or load bearing properties. Similarly the use of flameproofing additives may upset the surface chemistry of the foaming system and lead to severe destruction of internal cell structures, formation of a coarse cell structure and/or collapse of the foam. The difficulty in successful flameproofing urethane foams as opposed to bulk materials is further complicated by the troublesome problems of proper additive distribution at gas-solid interfacial surfaces due to the inherent physical movement of the composition during the foaming operation.

The present invention is based on the discovery that halogen-containing polyethers in combination with antimony trioxide are highly effective for achieving flame resistance in cellular polyurethane foams. It has been found that when antimoy trioxide and a halogen-containing polyether obtained by condensing an aliphatic haloepoxide with a polyol are incorporated in urethane reaction systems comprising polyisocyanates and the mixture foamed by the one-shot, semiprepolymer or prepolymer technique, the polyurethane foams obtained thereby possess a high degree of flame resistance. By means of the invention a synergistic effect is produced between antimony trioxide and a halogen-containing polyether chemically combined in the urethane molecule by reaction with isocyanato groups to provide foamed urethane compositions which are classified as self-extinguishing or non-burning in the ASTM D–1692 flammability test. The achievement of flame resistant polyurethane foams according to the invention thus broadens considerably their realm of practical utility.

The term "halogen-containing polyether" as used herein refers to acyclic, alicyclic and aryl-substituted acyclic compounds having at least two acyclic ether oxygens, at least two halogen atoms and two or more hydroxyl groups. The term "flame-resistant" is used to characterize a material which does not burn readily.

In accordance with the invention flame-resistant polyurethane foams are prepared by mixing together a polyisocynate and halogen-containing polyether with about 0.5 to 15.0% by weight, based on the reaction mixture, antimony trioxide, building up the urethane polymer network and thereafter developing the foam reaction in the presence of a catalyst by means of an internally developed or externally added blowing agent. The antimony trioxide can be added to the liquid polyether, the isocyanate or the polyetherisocyanate reaction mixture. The network formation and foam development can take place substantially simultaneously, as in the one-shot method, or in more or less distinct steps as in the prepolymer and semiprepolymer techniques.

The halogen-containing polyethers used in combination with antimony trioxide are condensation products obtained by reacting an aliphatic haloepoxide with a polyol to produce polyethers containing chemically combined halogen in the polyether molecule. The reaction is carried out at temperatures between about 25° C. and 175° C. and in the presence of an acidic condensation catalyst. Typical catalysts are those of the Friedel-Crafts type, including $AlCl_3$, $BF_3$, $ZnCl_2$ and the $BF_3$ etherates, which are used in concentrations of about 0.01 to 0.5%, based on the polyol and epoxide. The condensation of polyols with haloepoxides to form halogen-containing polyethers is well known and has been described in U.S. Patent 2,581,464, hereby incorporated by reference to the extent pertinent.

The haloepoxides used for the preparation of the aforesaid polyethers are aliphatic haloepoxides, saturated or unsaturated, which contain 3 to 10 carbon atoms. The halogen constituent of the epoxide is preferably a chlorine atom although the bromine and iodine constituents can be used with good results. Similarly the epoxide molecule, if desired, can be substituted with more than one halogen constituent.

Representative aliphatic haloepoxides include chloroprene oxide;
3-chloro-1,2-epoxypropane;
3-chloro-1,2-epoxybutane;
1-chloro-2,3-epoxybutane;
1-chloro-3,4-epoxy-1-butene;
3,4-dichloro-1,2-epoxybutane;
1,4-dichloro-2,3-epoxybutane;
chloroisobutylene oxide;
1-chloro-2,3-epoxypentane;
4-chloro-2,3-epoxypentane;
3-chloro-1,2-epoxypentane;
1,4-dichloro-2,3-epoxypentane;
1-chloro-2,3-epoxyhexane;
1,4-dichloro-2,3-epoxyhexane;
2-chloro-3,4-epoxyhexane;
2,5-dichloro-3,4-epoxyhexane;
4-chloro-2,3-epoxyhexane;
1-chloro-2,3-epoxyheptane;
1,4-dichloro-2,3-epoxyheptane;
4-chloro-2,3-epoxyheptane;
2-chloro-3,4-epoxyheptane;
5-chloro-3,4-epoxyheptane;
2,5-dichloro-3,4-epoxyheptane;
1-chloro-2,3-epoxyoctane;
4-chloro-2,3-epoxyoctane;
1,4-dichloro-2,3-epoxyoctane;
2,3-epoxy-2-ethylhexyl chloride;
3-chloro-4,5-epoxyoctane;
3,6-dichloro-4,5-epoxyoctane;
2,5-dichloro-3,4-epoxyoctane;
5-chloro-3,4-epoxyoctane;
2-chloro-3,4-epoxyoctane;
1-chloro-2,3-epoxynonane;

4-chloro-2,3-epoxynonane;
1,4-dichloro-2,3-epoxynonane;
2-chloro-3,4-epoxynonane;
5-chloro-3,4-epoxynonane;
2,5-dichloro-3,4-epoxynonane;
3-chloro-4,5-epoxynonane;
6-chloro-4,5-epoxynonane;
3,6-dichloro-4,5-epoxynonane;
1-chloro-2,3-epoxydecane;
4-chloro-2,3-epoxydecane;
1,4-dichloro-2,3-epoxydecane;
2-chloro-3,4-epoxydecane;
5-chloro-3,4-decane;
2,5-dichloro-3,4-epoxydecane;
3-chloro-4,5-epoxydecane;
6-chloro-4,5-epoxydecane;
3,6-dichloro-4,5-epoxydecane;
4-chloro-5,6-epoxydecane; and
4,7-dichloro-5,6-epoxydecane; etc.

The haloepoxides which are employed may be a single compound of definite composition or a mixture of epoxides.

The amount of haloepoxide condensed with the polyol will vary within considerable limits depending upon such considerations as the halogen content of the haloepoxide, the molecular weight of the polyol, its degree of functionality and whether the resulting halogen-containing polyether is used alone or in combination with other active hydrogen compounds in the preparation of urethane foams. Thus, for example, a polypropylene glycol of 2000 molecular weight can be reacted with two moles of an aliphatic haloepoxide, such as 3-chloro-1,2-epoxypropane, to form a halogen-containing polyether which can be used as the sole active hydrogen compound in preparing a flame resistant urethane foam. Similarly, it is also within the scope of the invention to add varying amounts of a halogen-containing polyether to a non-halogen polyether before reacting it with isocyanate. Thus, 3-chloro-1,2-epoxypropane can be reacted with a saturated aliphatic polyol such as glycerol, 1,2,4-butanetriol, 1,2,6-hexanetriol, trimethylolpropane, pentaerythritol, sorbitol, sucrose, and the like, to provide halogen-containing polyethers which have a hydroxyl number in the range of about 200 to 750. When admixed with a non-halogen polyether such compounds serve to increase the hydroxyl number thereof and have the advantage, after reaction with isocyanate, of further diversifying the combinations of characteristics obtainable in the flame-resistant foam by increasing the number of cross linking sites, which results in a rapid build-up of viscosity simultaneous with foam development.

In forming the halogen-containing polyethers, the amount of haloepoxide should be such as to provide a chemically combined halogen content ranging from about 3% to 35% by weight, preferably 10 to 30%, in the resulting polyether. As the halogen content of the polyether is varied within the aforesaid ranges, the halogen content of the polyurethanes formed therefrom will range from about 0.5 to 30% by weight, based on the polyether-isocyanate reaction product.

The polyols which can be used for the preparation of the halogen-containing polyethers include a wide variety of compounds which contain at least two hydroxyl groups and are substantially free from functional groups other than hydroxyl groups. After condensation with the haloepoxides, the resulting polyethers contain at least two hydroxyl groups, a plurality of acyclic ether oxygens and a molecular weight, based on their hydroxyl value, of about 200 to 5000.

Illustrative polyols include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be used include glycerol, trimethylolpropane, 1,2,6-hexanetriol, pentaerythritol, sorbitol, glycosides, such as methyl, ethyl, propyl, butyl and 2-ethylhexyl arabinoside, xyloside, fructoside, glucoside, rhammoside, etc., and the polyethers prepared therefrom by reaction with ethylene oxide, propylene oxide, butylene oxide, or mixtures thereof such as, for example, the alkylene oxide adduct of sucrose:

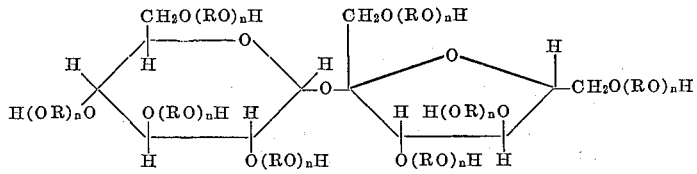

wherein R is ethylene, propylene, butylene, or mixtures thereof and $n$ is an integer such that the average molecular weight of the polyether is 200 and higher.

Further included as polyols are the mononuclear polyhydroxybenzenes such as resorcinol, pyrogallol, phlorglucinol, hydroquinone, 4,6-di-t-butylcatechol, catechol, orcinol, methylphoroglucinol, 2,5,6-trimethylresorcinol, 4 - ethyl - 5,6 - dimethylresorcinol, n-hexylresorcinol, 4-chloro-5-methylresorcinol, and the like; fused ring systems such as 3-hydroxy-2-naphthol, 6,7-dihydroxy-1-naphthol, 2-hydroxy-1-naphthol, 2,5-dihydroxy-1-naphthol, 9,10-dihydroxyanthracene, 2,3-dihydroxyphenanthrene, etc. and the polyethers prepared therefrom by reaction with a 1,2-alkylene oxide such as ethylene, propylene or butylene oxide.

Other polyols which can be employed are polynuclear hydroxybenzenes such as the various di-, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis(p-hydroxyphenyl)propane; bis(p - hydroxyphenyl)methane and the various diphenols and diphenylol methanes disclosed in U.S. Patents 2,506,486 and 2,744,882, respectively.

Exemplary triphenylol compounds which can be employed include the
Alpha,alpha,omega,tris(hydroxyphenyl)alkanes such as
    1,1,2-tris(hydroxyphenyl)ethanes;
1,1,3-tris(hydroxyphenyl)propanes;
1,1,3-tris(hydroxy-3-methylphenyl)propanes;
1,1,3-tris(dihydroxy-3-methylphenyl)propanes;
1,1,3-tris(hydroxy-2,4-dimethylphenyl)propane;
1,1,3-tris(hydroxy-2,5-dimethylphenyl)propanes;
1,1,3-tris(hydroxy-2,6-dimethylphenyl)propane;

1,1,4-tris(hydroxyphenyl)butanes;
1,1,4-tris(hydroxyphenyl)-2-ethylbutanes;
1,1,4-tris(dihydroxyphenyl)butanes;
1,1,5-tris(hydroxyphenyl)-3-methylpentanes;
1,1,8-tris(hydroxyphenyl)octanes;
1,1,10-tris(hydroxyphenyl)decanes, and the like.

Tetraphenylol compounds include the

Alpha,alpha,omega,omega,tetrakis(hydroxyphenyl)
alkanes such as 1,1,2,2-tetrakis(hydroxyphenyl)ethanes;
1,1,3,3-tetrakis(hydroxy-3-methylphenyl)propanes;
1,1,3,3-tetrakis(dihydroxy-3-methylphenyl)propanes;
1,1,4,4-tetrakis(hydroxyphenyl)butanes;
1,1,4,4-tetrakis(hydroxyphenyl)-2-ethylbutanes;
1,1,5,5-tetrakis(hydroxyphenyl)pentanes;
1,1,5,5-tetrakis(hydroxyphenyl)-3-methylpentanes;
1,1,5,5-tetrakis(dihydroxyphenyl)pentanes;
1,1,8,8-tetrakis(hydroxy-3-butylphenyl)octanes;
1,1,8,8-tetrakis(dihydroxy-3-butylphenyl)octanes;
1,1,8,8-tetrakis(hydroxy-2,5-dimethylphenyl)octanes;
1,1,10,10-tetrakis(hydroxyphenyl)decanes;

and the corresponding compounds which contain substituent groups in the hydrocarbon chain such as 1,1,6,6-tetrakis(hydroxyphenyl)-2-hydroxyhexanes;
1,1,6,6-tetrakis(hydroxyphenyl)-2-hydroxy-5-methylhexanes;
1,1,7,7-tetrakis(hydroxyphenyl)-3-hydroxyheptanes; and the like.

Also included within the scope of the above described polynuclear hydroxybenzenes are the 1,2-alkylene oxide addition products thereof with ethylene, propylene and butylene oxides. Still other particularly useful polyols which can be employed are the phenolic and resole type resinous materials, including the 1,2-alkylene oxide addition products thereof.

Novolaks are believed to be the mixtures of polynuclear compounds of the diphenylmethane type of structure, such as 4,4'-dihydroxydiphenylmethane and 2,4-dihydroxydiphenylmethane formed by the Baeyer reaction of phenol and formaldehyde. In a typical synthesis, novolaks are prepared by condensing one mole of phenolic compound, such as phenol or cresol, with 0.8 mole of an aldehyde, such as formaldehyde or furfural, under acid conditions at a temperature around 160° C. to 170° C. The polynuclear products frequently contain 4 to 8 units and may contain 12 or more units. Novolaks, as such, are non-curable, thermoplastic resins. Resoles, or Bakelite-type resins, are one-stage thermosetting resins produced by the condensation of phenols and aldehydes under alkaline conditions. It is believed that resoles differ from novolaks in that polynuclear methylol-substituted phenols are formed as intermediates in the case of the resoles. A resole produced by the condensation of phenol with formaldehyde most likely proceeds through an intermediate having the following illustrated type of structure:

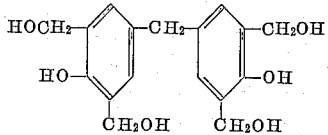

In a typical synthesis, resoles are prepared by heating one mole of phenol with 1.5 moles of formaldehyde under alkaline conditions. Then water and other volatiles are removed and condensation is completed at elevated temperatures under pressure.

As indicated previously, the halogen-containing polyethers may be the sole active hydrogen compound used for reaction with isocyanates or they may be used in combination with other nonhalogen polyethers. Among the non-halogen polyethers which can be used in preparing the polyurethane foams are any of the above described polyoxyalkylene polyols prepared by reaction of ethylene oxide, propylene oxide and butylene oxide and mixtures thereof, with acyclic polyols, alicyclic polyols and the various mono-, di-, tri- and tetraphenylol compounds. Further included are polyethers prepared by the addition of ethylene oxide, propylene oxide and butylene oxide to ammonia or a primary or secondary amine such as ethylenediamine, triethanolamine, diethylenediamine, and the like.

The molecular weight of any given polyether employed will vary, of course, depending upon the characteristics desired in the foamed urethane product. As a general guide, the halogen-containing polyethers, including mixtures thereof with non-halogen polyethers, should be such as to provide hydroxyl numbers ranging from about 30 to 750.

A variety of isocyanates may be employed for reaction with the polyethers above described to provide urethane foams which can be stabilized according to the invention. Preferred isocyanates are polyisocyanates and polyisothiocyanates of the general formula:

$$R(NCG)_x$$

wherein G is oxygen or sulfur, $x$ is an integer of two or more and R is an alkylene, substituted alkylene, arylene, or substituted arylene radical, a hydrocarbon, or substituted hydrocarbon containing one or more aryl —NCG bonds and one or more alkyl —NCG bond. R can also include radicals such as —RZR— where Z may be a divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-menthane, xylylene diisocyanates

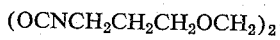

1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylene-α,α' - diisothiocyanate, and isopropylbenzene-α,4-diisocyanate.

Further included are dimers and trimers of isocyanates and diisocyanates and polymeric diisocyanates of the general formulae:

$$(RNCG)_x \text{ and } [R(NCG)_x]_y$$

in which $x$ and $y$ are two or more, as well as compounds of the general formula:

$$M(NCG)_x$$

in which $x$ is one or more and M is a monofunctional or poly-functional atom or group. Examples of this type include ethylphosphonic diisocyanate

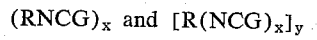

phenylphosphonic diisocyanate, C$_6$H$_5$P(NCO)$_2$; compounds containing a ≡Si—NCG group; isocyanates derived from sulfonamides (RSO$_2$NCO); cyanic acid; thiocyanic acid; and compounds containing a metal-NCG group such as tributyltin isocyanate.

The preparation of polyether-based urethane foams can be carried out by the one-shot, semiprepolymer or prepolymer techniques, all of which are well known. The preferred procedure is the semiprepolymer technique wherein the polyether reactant is partially extended with excess isocyanate to provide a reaction product containing a high percentage of free isocyanato groups (20 to 35%) which is foamed at a later stage by reaction with additional polyether, catalyst and a blowing agent such as water or a fluorocarbon.

The amount of isocyanate employed will depend upon the density of the urethane foam and the amount of cross linking desired. In general the total —NCO equivalent to total active hydrogen equivalent should be such as to provide a ratio of 0.8 to 1.2 equivalents of —NCO per equivalent of active hydrogen, and preferably a ratio of about 0.9 to 1.1 equivalents.

The foaming operation is preferably effected by liquified fluorocarbon gases which have boiling points below about 80° F. and above —60° F. The liquified gases are saturated aliphatic hydrocarbons which vaporize at or below the temperature of the foaming mass. Such gases are at least partially fluorinated and may also be otherwise halogenated.

Preferred blowing agents are the fluorocarbons such as trichloromonofluoromethane; dichlordifluoromethane, dichlorofluoromethane, 1,1 - dichloro-1-fluoroethane; 1-chloro-1,1 - difluoro, 2,2 - dichloroethane; and 1,1,1-trifluoro, 2 - chloro-2-fluoro, 3,3 - difluoro-4,4,4-trifluorobutane. The amount of blowing agent used will vary with density desired in the foamed product. In general it may be stated that for 100 grams of resin mix containing an average NCO/OH ratio of 1 to 1, about 0.005 to 0.3 mole of gas are used to provide densities ranging from 30 to 1 lb. per cubic foot. If desired, water may be used in conjunction with the blowing agent.

Catalysts that are suitable for accelerating the polyether-isocyanate reaction include a wide variety of organic tin catalysts.

Among the organic tin compounds that deserve particular mention are stannous acylates such as stannous acetate, stannous octoate, stannous laurate, stannous oleate, etc.; stannous alkoxides such as stannous butoxide, stannous 2-ethylhexoxide, stannous phenoxide, o, m, and p-stannous cresoxides, etc.; dialkyl tin salts of carboxylic acids, e.g., dibutyltin diacetate, dibutyltin dilaurate, dibutyltin maleate, dilauryltin diacetate, dioctyltin diacetate, and the like. Similarly there may be used a trialkyltin hydroxide, dialkyltin oxide or dialkyltin chloride. Examples of these compounds include trimethyltin hydroxide, tributyltin hydroxide, trioctyltin hydroxide, dibutyltin oxide, dioctyltin oxide, dilauryltin oxide, dibutyltin dichloride, dioctyltin dichloride, and the like.

Other catalysts which can be used alone or in combination with the above-indicated tin catalysts are amine catalysts such as 2,2,1-diazabicyclooctane, trimethylamine, 1,2-dimethylimidazole, triethylamine, diethylcyclohexylamine, N-methylmorpholine, triethanolamine and N,N,N',N'-tetramethyl-1,3-butanediamine. In many instances superior improvement is obtained when using an amine catalyst in combination with one of the above-noted tin catalysts.

It is also within the scope of the invention to employ small amounts, e.g., about 0.001% to 5.0% by weight, based on the total ingredients, of an emulsifying agent such as a siloxane-oxyalkylene copolymer having from about 10 to 80 percent by weight of siloxane polymer and from 90 to 20 percent by weight of alkylene oxide polymer, such as the copolymers described in U.S. Patent 2,834,748. Although the use of an emulsifier is desirable to influence the type of foam structure that is formed, the foam products of the invention can be prepared without emulsifiers.

The following examples illustrate the best mode now contemplated for carrying out the invention.

*Example 1*

92.4 grams of a propylene oxide addition product of sorbitol (hydroxyl No. 490) and 61.6 grams of a condensation product obtained by reacting 3-chloro-1,2-epoxypropane with glycerol (hydroxyl No. 595) were mixed with 142.6 grams of tolylene diisocyanate, 0.6 gram of a silicone oil surfactant (siloxane-oxyalkylene copolymer), 1.0 gram dibutyltin dilaurate and 45.1 grams trichloromonofluoromethane. As soon as the mixture began to foam it was poured into an open mold and cured for 10 minutes as 70° C. The foamed product had a density of 2.3 lbs./cu. ft.

*Example 2*

52.5 grams of a 3-chloro-1,2-epoxypropane condensation product of sorbitol (hydroxyl No. 412) and 76.5 grams of tolylene diisoycanate were mixed with 97.5 grams of a propylene oxide addition product of 1,1,3-tris-(hydroxyphenyl)propane (hydroxyl No. 250), 1.0 gram of dibutyltin dilaurate, 0.7 gram of a silicone oil surfactant (siloxane-oxyalkylene copolymer) and 43 grams trichloromonofluoromethane. As soon as the mixture began to foam it was poured into an open mold and allowed to cure for 10 minutes at 70° C. The foamed product had a density of about 1.9 lbs./cu. ft.

*Example 3*

105.7 grams of a semiprepolymer prepared by reacting a 3-chloro-1,2-epoxypropane condensation product of sorbitol (hydroxyl No. 434) with tolylene diisocyanate (30.1% total free NCO) were mixed with 0.65 gram of a silicone oil surfactant (siloxane-oxyalkylene copolymer), 0.75 gram dibutyltin dilaurate and 45 grams trichloromonofluoromethane. As soon as the mixture began to foam it was poured into an open mold and cured for 10 minutes at 70° C. The foamed product had a density of 1.9 lbs./cu. ft.

*Example 4*

55 grams of a 3-chloro-1,2-epoxypropane condensation product of sorbitol (hydroxyl No. 412), 27.5 grams of a mixture comprising 70% by weight of a propylene oxide addition product of 1,1,3-tris(hydroxyphenyl)propane (hydroxyl No. 250) with 30% by weight of a propylene oxide addition product of glycerol (hydroxyl No. 633) and 126.5 grams of a semiprepolymer prepared from the mixture (29.0% total free NCO) were mixed with 27.5 grams of a propylene oxide adduct of diethylenetriamine (hydroxyl No. 682), 1.0 grams of a silicone oil surfactant (siloxaneoxyalkylene copolymer), 0.3 gram dibutyltin dilaurate and 46 grams of trichloromonofluoromethane. As soon as the mixture began to foam it was poured into an open mold and allowed to cure for 10 minutes at 70° C. The foamed product had a density of 1.7 lbs./cu. ft.

*Example 5*

55 grams of a 3-chloro-1,2-epoxypropane condensation product of sorbitol (hydroxyl No. 412), 27.5 grams of a mixture comprising 70% by weight of a propylene oxide addition product of 1,1,3-tris(hydroxyphenyl)propane (hydroxyl No. 250) with 30% by weight of a propylene oxide addition product of glycerol (hydroxyl No. 633) and 141.0 grams of a semiprepolymer prepared from the mixture (29.0% total free NCO) were mixed with 27.5 grams of a propylene oxide adduct of diethylenetriamine (hydroxyl No. 682), 1.0 gram of a silicone oil surfactant (siloxane-oxyalkylene copolymer), 0.3 gram dibutyltin dilaurate and 46 grams of trichloromonofluoromethane. As soon as the mixture began to foam it was poured into an open mold and allowed to cure for 10 minutes at 70° C. The foamed product had a density of 1.7 lbs./cu. ft.

*Example 6*

55 grams of a 3-chloro-1,2-epoxypropane condensation product of sorbitol (hydroxyl No. 412) and 5 grams of 1,2,6-hexanetriol were mixed with 50 grams of a mixture comprising 70% by weight of a propylene oxide addition product of 1,1,3-tris(hydroxyphenyl)propane (hydroxyl No. 250) with 30% by weight of a propylene oxide addition product of glycerol (hydroxyl No. 633), 136 grams of a semiprepolymer prepared from the mixture (29.0% total free NCO), 0.7 gram dibutyltin dilaurate, 0.7 gram of a silicone oil surfactant (siloxane-oxyalkylene copolymer), and 44 grams of trichloromonofluoromethane. As soon as the mixture began to foam it was poured into an open mold and allowed to cure for 10 minutes at 70° C. The foamed product had a density of 1.8 lbs./cu. ft.

*Example 7*

97.5 grams of a propylene oxide addition product of glycol (hydroxyl No. 640) and 52.5 grams of a 3-chloro-1,2-epoxypropane condensation product of sorbitol were mixed with 138.5 grams of tolylene diisocyanate, 0.1 gram of a silicone oil surfactant (siloxane-oxyalkylene copolymer), 0.7 gram dibutyltin dilaurate, and 42 grams of trichloromonofluoromethane. As soon as the mixture began to foam it was poured into an open mold and allowed to cure for 10 minutes at 70° C. The foamed product had a density of 1.8 lbs./cu. ft.

*Example 8*

97.5 grams of a propylene oxide addition product of sorbitol (hydroxyl No. 490) and 52.5 grams of a 3-chloro-1,2-epoxypropane condensation product of sorbitol (hydroxyl No. 412) were mixed with 115.5 grams tolylene diisocyanate, 0.7 gram dibutyltin dilaurate, 0.7 gram of a silicone oil surfactant (siloxane-oxyalkylene copolymer), and 43 grams of trichloromonofluoromethane. As soon as the reaction mixture began to foam it was poured into an open mold and allowed to cure for 10 minutes at 70° C. The foamed product had a density of 2.0 lbs./cu. ft.

*Example 9*

55 grams of a propylene oxide addition product of diethylenetriamine (hydroxyl No. 493) and 55 grams of a 3-chloro-1,2-epoxypropane condensation product of sorbitol (hydroxyl No. 412) were mixed with 141 grams of a semiprepolymer prepared from a propylene oxide addition product of sorbitol (28.9% total free NCO), 0.05 gram dibutyltin dilaurate, 1.0 gram of a silicone oil surfactant (siloxane-oxyalkylene copolymer) and 46 grams of trichloromonofluoromethane. As soon as the reaction mixture began to foam it was poured into an open mold and allowed to cure for 10 minutes at 70° C. The foamed product had a density of 1.8 lbs./cu. ft.

*Example 10*

97.5 grams of a propylene oxide addition product of trimethylolpropane (hydroxyl No. 530) and 52.5 grams of a 3-chloro-1,2-epoxypropane condensation product of sorbitol (hydroxyl No. 412) were mixed with 121 grams of tolylene diisocyanate, 0.7 gram of a silicone oil surfactant (siloxaneoxyalkylene copolymer), 0.7 gram dibutyltin dilaurate and 43 grams of trichloromonofluoromethane. As soon as the mixture began to foam it was poured into an open mold and allowed to cure for 10 minutes at 70° C. The foamed product had a density of 2.0 lbs./cu. ft.

*Example 11*

154 grams of a 3-chloro-1,2-epoxypropane condensation product of sorbitol (hydroxyl No. 434) were mixed with 111.1 grams of tolylene diisocyanate, 1.0 gram dibutyltin dilaurate, 0.6 gram silicone oil (siloxane-oxyalkylene copolymer) and 45.1 grams of trichloromonofluoromethane. As soon as the mixture began to foam it was poured into an open mold and allowed to cure for 10 minutes at 70° C. The foamed product had a density of 2.1 lbs./cu. ft.

Hydroxyl numbers given in the foregoing examples are a measure of the hydroxyl concentration per unit weight of polyol. The hydroxyl number is defined in terms of milligrams of KOH equivalent per gram of polyol and is determined by reacting acetic anhydride (in pyridine solution) at refluxing temperature with the hydroxyl groups of the polyol. The unreacted anhydride and acetic acid formed are titrated with aqueous sodium hydroxide using phenolphthalein as an indicator.

Polyurethane foams as prepared in Examples 1 to 11 were blended prior to foaming with varying amounts of antimony trioxide and tested for flammability characteristics according to the "Tentative Method of Test for Flammability of Plastic Foams and Sheeting," ASTM D-1692-59T. In this test the flame of a Bunsen burner, having a blue cone of about 1½ inches in height, is applied separately to the front edge of ten foam specimens, 6" x 2" x ½", and allowed to remain in contact therewith for a period of sixty seconds. The extent of burning is considered the furthermost point reached by the flame front whereas the burning rate in inches per minutes is a measure of the time necessary for the flame front to consume five inches of the foam specimen. A sample is judged "non-burning" if no evidence of ignition, such as flame or progressive glow, is seen in each specimen after removal of the flame. If the flame front of two or more specimens reaches the five inch mark the sample is judged "burning." A sample is judged "self-extinguishing" when ignition of the ten specimens gives an extent of burning less than five inches.

The data tabulated in Table I below illustrate that polyurethane foams can be readily rendered flame-resistant through use of antimony trioxide and halogen-containing polyethers. The density of each foam varied slightly from those values given in the examples.

*Table I*

| Ex. | Wt. percent Cl | Wt. percent $Sb_2O_3$ | Appearance [2] | ASTM Class | Rate or Extent | Ig/B [1] |
|---|---|---|---|---|---|---|
| 1 | 6.6 | 0 | BAB | B | 4.1 i.p.m. | |
| 1 | 6.5 | 3.0 | BBB | S | 2.9 in. | |
| 1 | 6.3 | 4.0 | AAB | S | 2.2 in. | |
| 1 | 6.3 | 5.0 | ABB | S | 2.5 in. | |
| 1 | 6.2 | 6.0 | AAB | S | 2.4 in. | |
| 1 | 6.1 | 7.0 | AAB | S | 2.4 in. | |
| 2 | 5.8 | 0 | AAA | B | 3.0 i.p.m. | 8/113 |
| 2 | 5.5 | 4.0 | AAA | S | 1.4 in. | 13/33 |
| 2 | 5.4 | 6.0 | AAA | N | | 0/60 |
| 2 | 5.3 | 8.0 | AAA | S | 1.9 in. | 13/47 |
| 3 | 2.4 | 5.9 | AAB | S | 0.8 in. | |
| 3 | 2.6 | 0 | AAA | B | 3.0 i.p.m. | |
| 3 | 2.5 | 3.0 | AAA | S | 1.1 in. | |
| 3 | 2.4 | 5.0 | AAA | S | 1.3 in. | |
| 3 | 2.4 | 7.0 | AAA | S | 1.1 in. | |
| 4 | 5.8 | 0 | AAA | B | 4.4 i.p.m. | 8/99 |
| 4 | 5.5 | 4.0 | AAA | N | | 0/60 |
| 4 | 5.4 | 6.0 | AAA | N | | 0/60 |
| 4 | 5.3 | 8.0 | | N | | 0/60 |
| 5 | 5.5 | 0 | AAA | B | 5.1 i.p.m. | 8/95 |
| 5 | 5.2 | 4.0 | AAA | S | 2.0 in. | 12/47 |
| 5 | 5.1 | 6.0 | AAA | S | 1.5 in. | 15/51 |
| 5 | 5.0 | 8.0 | AAA | N | | 0/60 |
| 6 | 5.6 | 0 | AAA | B | 3.7 i.p.m. | 10/117 |
| 6 | 5.4 | 4.0 | AAA | B | 3.7 i.p.m. | 4/72 |
| 6 | 5.2 | 6.0 | AAA | N | | 0/60 |
| 6 | 5.1 | 8.0 | AAA | N | | 0/60 |
| 7 | 4.7 | 0 | | B | 1.1 i.p.m. | 8/67 |
| 7 | 4.5 | 4.0 | | | | |
| 7 | 4.4 | 6.0 | | | | |
| 7 | 4.3 | 8.0 | | | | |
| 8 | 5.0 | 0 | AAA | B | 5.8 i.p.m. | 10/100 |
| 8 | 4.8 | 4.0 | AAA | S | 3.4 in. | 15/71 |
| 8 | 4.7 | 6.0 | AAA | S | 2.8 in. | 15/70 |
| 8 | 4.6 | 8.0 | AAA | N | 0.8 in. | 0/60 |
| 9 | 5.5 | 0 | AAA | B | 6.2 i.p.m. | 7/86.6 |
| 9 | 5.2 | 4.0 | AAA | S | 3.2 in. | 12/65.9 |
| 9 | 5.1 | 6.0 | | S | 2.6 in. | 12/56.9 |
| 9 | 5.0 | 8.0 | AAA | S | 2.0 in. | 13/49 |
| 10 | 4.6 | 8.0 | AAA | N | 0.9 in. | 18/36 |
| 11 | 13.7 | 3.0 | AAB | S | 0.7 in. | |
| 11 | 13.5 | 4.0 | BBA | S | 0.8 in. | |
| 11 | 13.4 | 5.0 | ABB | S | 0.7 in. | |
| 11 | 13.2 | 6.0 | AAA | S | 0.7 in. | |
| 11 | 13.1 | 7.0 | AAA | S | 0.8 in. | |

[1] Ignition time in seconds/extinguishment time in seconds.
[2] The appearance of the foam is rated by a three-letter code with the first letter estimating average cell size, the second letter uniformity of cell size and the third letter bulk flaws (splits, ridges, burns, etc.) wherein—

| 1st Letter | 2d Letter | 3d Letter |
|---|---|---|
| A=Fine | Good | None. |
| B=Medium | Fair | Minor. |
| C=Large | Poor | Severe. |

What is claimed is:

1. A method for the preparation of flame-resistant polyurethane foams in which from about 0.5 to 15.0 percent by weight antimony trioxide in admixture with a halogen-containing polyether having at least two hydroxyl groups and a halogen content ranging from about 3% to 35% by weight prepared by condensation of aliphatic haloepoxides with polyols is reacted with an organic polyisocyanate in the presence of a blowing agent.

2. The method of claim 1 wherein the halogen-containing polyether has a molecular weight of from about 200 to 5000.

3. The method of claim 2 wherein the polyol is an alkylene oxide addition product of an acyclic polyol.

4. The method of claim 3 wherein the hydroxyl number of the alkylene oxide addition product of the acyclic polyol is within the range of about 200 to 750.

5. The method of claim 4 wherein the epoxide is 3-chloro-1,2-epoxypropane.

6. The method of claim 5 wherein the polyol is glycerol.

7. The method of claim 5 wherein the polyol is sorbitol.

8. A flame-resistant polyurethane foam composition consisting essentially of (1) 0.5 to about 15 percent by weight based on the reaction mixture of antimony trioxide in admixture with the reaction product of (2) a halogen containing polyether having at least two hydroxyl groups and prepared by the condensation of an epihalohydrin with a polyol, (3) a non-halogen containing polyether polyol, and (4) an organic polyisocyanate in the presence of (5) a blowing agent.

References Cited by the Examiner

UNITED STATES PATENTS

| | | | |
|---|---|---|---|
| 2,577,281 | 12/1951 | Simon et al. | 260—2.5 |
| 2,581,464 | 1/1952 | Zech | 260—348 |
| 2,853,472 | 9/1958 | Schroeder et al. | 260—2.5 |
| 2,962,455 | 11/1960 | Hostettler et al. | 260—2.5 |

LEON J. BERCOVITZ, *Primary Examiner.*

DAN ARNOLD, *Examiner.*

D. E. CZAJA, *Assistant Examiner.*